United States Patent [19]

Suzuki et al.

[11] 4,373,206
[45] Feb. 8, 1983

[54] TRANSMITTER CONTROL SYSTEM

[75] Inventors: Yoshiharu Suzuki; Tomokazu Kai, both of Toyko, Japan

[73] Assignee: Nippon Electric Co., Inc., Tokyo, Japan

[21] Appl. No.: 220,132

[22] Filed: Dec. 24, 1980

[30] Foreign Application Priority Data

Dec. 28, 1979 [JP] Japan ................... 54-170433

[51] Int. Cl.³ .......................... H04B 1/02; H04B 3/60
[52] U.S. Cl. .................................. 455/103; 455/116; 455/125; 455/126
[58] Field of Search ............... 455/103, 126, 115–117, 455/125, 127, 31–34, 53, 54, 56, 62, 68; 179/2 E, 2 EA, 2 EB, 2 EC; 340/311.1

[56] References Cited

U.S. PATENT DOCUMENTS

| | | | |
|---|---|---|---|
| 2,844,712 | 7/1958 | Noizeux | 455/116 |
| 3,456,202 | 7/1969 | Miyagi | 455/116 |
| 3,870,957 | 3/1975 | Straw | 455/115 |
| 4,025,855 | 5/1977 | Atkinson | 455/117 |
| 4,308,429 | 12/1981 | Kai et al. | 455/33 |

Primary Examiner—Marc E. Bookbinder
Attorney, Agent, or Firm—Blakely, Sokoloff, Taylor & Zafman

[57] ABSTRACT

A transmitter control system for transmitters having means for selectively switching one channel to another in the multiple channels and means for controlling the transmitter output so as to deactivate, activate and reduce the transmitter output. The system comprises comparator means for comparing a start signal from the transmitter output control means with a detected signal of the transmitter output, the output of the comparator means being adapted to selectively drive at least one of the channel switching means for switching channels and a transmitter power reduction control circuit included in the transmitter output control means upon occurrence of a detected signal of the transmitter output indicative of a failure of the transmitter.

5 Claims, 10 Drawing Figures

TRANSMITTER CONTROL SYSTEM

BACKGROUND OF THE INVENTION

The present invention relates to a multi-channel mobile radio transmitter wherein call connection for mobile originating and/or mobile terminating is controlled through a common control channel, and more particularly, to a transmitter control system capable of preventing interference caused by the failure of the transmitter.

In the conventional multi-channel mobile radio communication system of this type, if the transmitter of a mobile telephone equipment continues transmission on a certain common control channel in the event of a failure of the transmission control circuit or switch circuit in the transmitter, for example, the connection control for all other mobile telephone equipments within the system is disturbed, resulting in a total system down.

To prevent such a malfunction a method has conventionally been known in which a transmitter on/off signal from the transmitter output control circuit is compared with a detected output signal from the FM transmitter by a comparator, and the output of the comparator drives a switching circuit so as to switch the power of the frequency generator. In this circuit arrangement, in the event of a failure of the transmitter such as transmission without a transmitter-on signal, the frequency generator is disabled so as to cut off the transmitter output power. In this expedient, however, if control signal lines between the transmitter output control circuit and the switch circuit are broken or short-circuited, the power supply to the frequency generator cannot be switched off and the FM transmitter continues transmission on the common control channel to cause the interference that results in a total system down.

SUMMARY OF THE INVENTION

The present invention intends to eliminate the foregoing deficiencies of conventional systems, and it is an object of the invention to provide a transmitter control system capable of preventing the interference in the system by switching the channel and reducing the transmitter output power on occurrence of a failure in the transmitter.

According to one general aspect of the present invention, there is provided a transmitter control system for transmitters having means for selectively switching one channel to another in the multiple channels and means for controlling the transmitter output power so as to deactivate, activate and reduce the transmitter output, wherein the system comprises comparator means for comparing a transmitter on/off signal from the transmitter output control means with a detected signal of the transmitter output, the output of the comparator means being adapted to selectively drive at least one of the channel switching means for switching channels and a transmitter output power reduction control circuit included in the transmitter output control means upon occurrence of a detected signal of the transmitter output indicative of a failure of the transmitter.

DETAILED DESCRIPTION OF THE PREFERRED EMBODIMENTS

Figure 1:
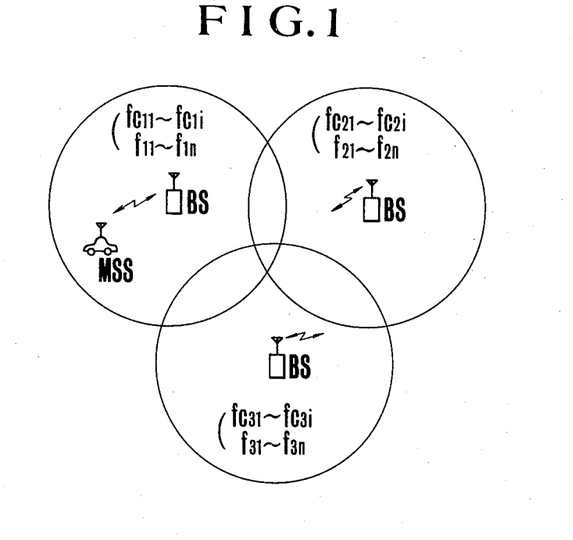
FIG. 1 is an illustration showing service zones of the mobile communication system.

Prior to the explanation of the preferred embodiments of this invention, a radio communication system to which the invention is applied and a mobile equipment used in the system will be described. In the mobile communication system with multiple cells (three cells in this example shown in FIG. 1), mobile equipments (MSs) are linked to the base station (BS) through radio channels so as to establish the communication. In order to use a limited number of channels efficiently, a common control channel system is employed for the radio channels. In the common control channel system, several of tens of channels or more are allotted in a service area in which several of hundreds of mobile equipments or more are available, and common control channels which are dedicated to call connection commonly for all mobile equipments are provided so as to assign the best speech channel in calling. Since a speech channel can be found from a number of idle speech channels and assigned, connection can be made in a short time and channels can be used efficiently.

Generally, in the common control channel system, one to ten and several common control channels (in this example, $f_{c11}$ to $f_{c1i}$, $f_{c21}$ to $f_{c2i}$, $f_{c31}$ to $f_{c3i}$; i being one to ten and several with different frequencies for individual cells) are provided and remaining several of tens to several of hundreds of channels (in this example, $f_{11}$ to $f_{1n}$, $f_{21}$ to $f_{2n}$, $f_{31}$ to $f_{3n}$; n being several of tens to several of hundreds) are used as speech channels. Here, $f_{11}$ for example is a combined frequency of a mobile transmitter frequency and a mobile receiver frequency which are apart from each other by a certain frequency. That is to say, although slightly different frequencies are used for the down-linked channel from the base station to a mobile equipment and the up-linked channel from a mobile equipment to the base station (for example, if the down-linked channel uses 500 MHz, the up-linked channel may use 510 MHz), these up/down channels are put together to be a single pair channel.

Therefore, while a mobile equipment waits for calling, it is locked onto one common control channel and waits for call origination by a mobile subscriber (MS), e.g. an operator who is going to telephone in a vehicle, or call termination by another mobile subscriber or land subscriber.

Figure 2:
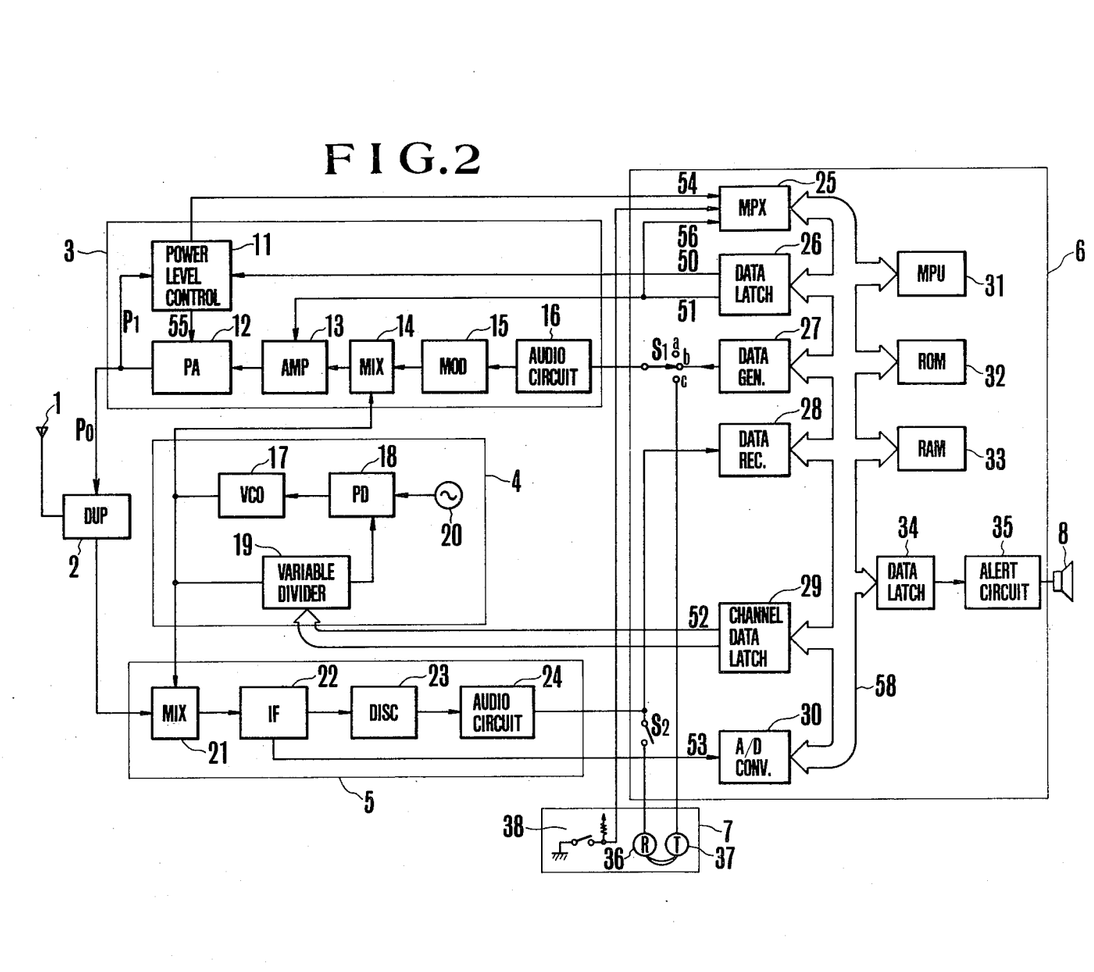
FIG. 2 is a block diagram showing an example of a mobile transceiver equipment including a transmitter control section in accordance with the present invention.

One example of mobile equipments used in such a communication system is shown in FIG. 2. A mobile equipment will move to arbitrary cells, and it must be able to access all assigned common control channels and all speech channels. Therefore, a frequency synthesizer unit 4 of the well-known phase locked loop type is used to generate these local frequencies. Desired local frequencies can be obtained by rewriting the contents of a channel data latch 29 in a logic unit 6 so as to vary the frequency dividing ratio of a variable divider 19.

On the other hand, the local frequency and a signal received by a receiver unit 5 are mixed down in a mixer 21 to obtain an audio signal through an FM discriminator 23, and sent to a receiver 36 in a handset 7 and a data receiver 28 in the logic unit 6. The receiver unit 5 has a function for measuring the signal strength received from the base station. The unit is provided with a tuning meter circuit 22 of FM-IF system such as CA3089 manufactured by RCA. An output voltage 53 derived from the circuit 22 in proportion to the signal strength from the base station is sent to an A/D converter 30 in the logic unit 6. This function, as will be described later, is used to vary the output power level of the mobile equipment depending on the received signal strength from the base station.

Figure 4:
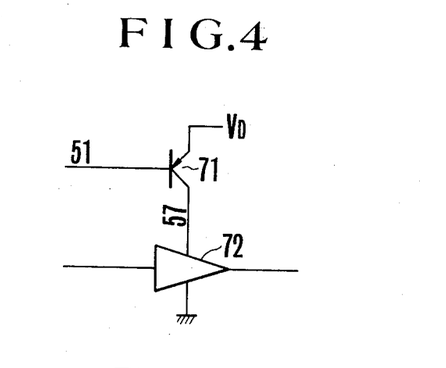
FIG. 4 is a circuit diagram of an exciter amplifier used in the mobile transmitter equipment shown in FIG. 2.
Figure 5:
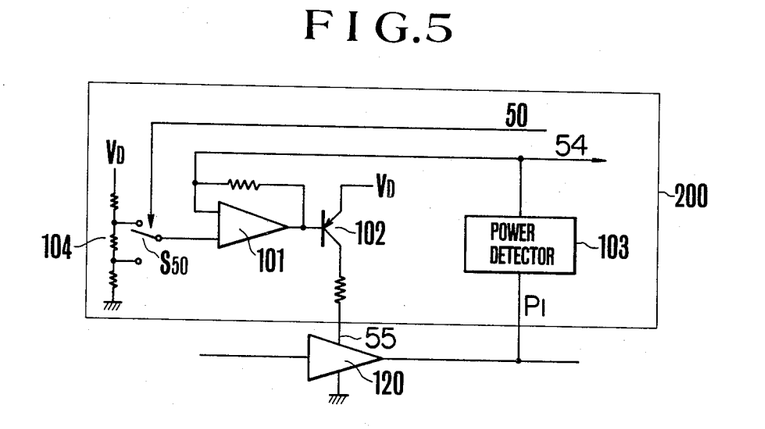
FIG. 5 is a circuit diagram of a power amplifier used in the mobile transceiver equipment shown in FIG. 2.

In a transmitter unit 3, an audio signal from a microphone 37 in the handset 7 or a signal from a data generator 27 in the logic unit 6 is introduced through an audio circuit 16 to a modulation circuit 15, and the modulated signal is mixed up with a local frequency from the frequency synthesizer unit in a mixer 14. The mixed signal is then delivered to an exciter amplifier 13. The exciter amplifier 13 includes a switching transistor 71 as shown in FIG. 4, and it is activated or deactivated by switching the power supply of $V_D$ for an exciter amplifier circuit 72 by a transmitter on/off signal 51 supplied from the logic unit 6 to the base of the switching transistor. The output of exciter amplifier 13 is further amplified by a power amplifier 12. This power amplifier is of a C-class amplifier, and it does not operate if the exciter amplifier has no output, and thus transmission is deactivated. The power amplifier 12 is provided with an ALC (Automatic Level Control) 200 as shown in FIG. 5 which keeps the output power level constant. The ALC 200 is included in an output power level control 11 as shown in FIG. 2. In the ALC circuit, the output of a power amplifier circuit 120 in the power amplifier 12 is detected by a power detector 103, which produces a voltage proportional to the output power level. The voltage is amplified by an operational amplifier circuit 101, and the amplified voltage drives the base of a transistor 102 which is connected to the power supply $V_D$ of the power amplifier, so that the output power is controlled to a constant level. The ALC is further provided with an additional circuit which receives a power reduction command 50 from the logic unit 6 to reduce the output of a voltage divider 104 by switching a switch S50 so as to reduce the output power.

The purpose of this reduction function is to present the interference called "intermodulation" from occurring in receivers of the base station which are associated with other channels than the channel now in use. The intermodulation is caused by an excessive input level to the receiver of the base station now in use when the mobile equipment is located near the base station. That is to say, when the received signal strength at a mobile equipment exceeds a predetermined level and the receiver of the base station concurrently receives a signal at the same level, the reference voltage applied to the operational amplifier 101 in FIG. 5 is varied by the command of logic unit 6 within the mobile equipment so as to reduce the power voltage applied to the power amplifier circuit 120 in power amplifier 12, and thus the RF output power is reduced.

In this embodiment, the logic circuit 6 is controlled by a universal microprocessor, and it includes an MPU (Micro-processor Unit) 31 such as Intel's 8080, a ROM (Read Only Memory) 32, a RAM (Random Access Memory) 33, the data generator 27 consisting of a parallel-in/serial-out shift register, the data receiver 28 consisting of a serial-in/parallel-out shift register, latch circuits 26, 29 and 34 such as Motorola's MC14174, a multiplexer 25 such as MC14051, the A/D converter 30 such as MC14443, and an alert tone generating circuit 35. In this embodiment, the operational sequence is controlled by procedures programmed in the ROM 32 for executing individual functions. Here, explanation of processing will be given as an example for the cases wherein a mobile equipment waits for a call (waits for a paging signal from the base station) and mobile terminating call is normal, with reference to the 7A to 7D flows charts (excluding portions enclosed by dotted lines in FIGS. 7B and 7C).

First, the mobile equipment determines which common control channel out of $f_{c11}$ to $f_{ci}$, $f_{c21}$ to $f_{2i}$ and $f_{c31}$ to $f_{c3i}$ (in the example shown in FIG. 1) is to be used for reception. All of these common control channels may have been stored in the ROM 32 of the mobile equipment or some of the common control channels may have been stored in the ROM with remaining common control channels being left for storage in the RAM 33 when system information signals from the base station will be received by the data receiver 28 in the mobile equipment. In any cases, the mobile equipment has information on designation of common control channels in its RAM and/or ROM.

The mobile equipment scans the stored common control channels and waits for a call on a channel with the highest received signal strength. Assumption is made that this channel is $f_{c11}$, the radio frequency toward the mobile equipment is $f_{c11D}$ and the radio frequency toward the base station is $f_{c11U}$. When the data receiver 28 receives a page code on channel $f_{c11D}$, the logic unit 6 sets data to the data latch 26 so as to switch on transmitter on/off signal 51. Then, the transmitter output is transmitted. That is to say, the MPU 31 sets the page response code to the data generator 27 in logic unit 6, and when the data generator 27 is connected to the modulator through a switch S1, serial data is transmitted to the base station. After the transmission of a page response code has been completed, data is set to the data latch 26 again so as to switch off the transmitter on/off signal 51. In such a way, one mobile equipment occupies a common control channel only for a short time, so that the common control channel is shared by a number of mobile equipments on time sharing basis. Following the transmission of the page response code, the mobile equipment waits for the assignment of a speech channel sent from the base station of $f_{c11D}$, and the data receiver 28 receives the data signal from the base station through this channel. Following the channel assignment, the logic unit loads the assigned speech channel to the channel data latch 29 which sends the data to synthesizer 4, and the radio frequency is switched to the speech channel (e.g. $f_{11}$).

Next, when the data receiver 28 receives the data signal from the base station for loop-checking the down-linked channel $f_{11D}$, the logic unit 6 switches on the transmitter on/off signal 51 again so as to transmit up-linked loop checking data from the data generator 27. Upon reception of the loop signal, the base station issues a ring code or alert code. When the data receiver 28 receives the ring code, it activates the alert tone circuit 35 to generate the alert tone signaling the mobile subscriber (the operator in the vehicle). The mobile subscriber hears the alert tone and hooks off a hook switch 38, then a switch S2 is turned on and communication is established. When the vehicle approaches the base station while the connection is maintained and if the received signal strength 53 exceeds the predetermined level, RF output power reduction for the transmitter will take place. The transmitter again restores full power transmission when the signal strength decreases below the predetermined level. When the mobile subscriber takes an on-hook action or when the release code from the base station is received, the mobile equipment carries out the clearing process and the original state is restored.

In the foregoing system, if troubles are accidentally raised in the mobile equipment, the output power can be kept transmitted regardless of the transmitter on/off command while the equipment, for example, waits for a call or waits for the channel assignment. When a trouble occurs during a wait, call process (including the state on the common channel for mobile origination), or communication, the common control channel for reception is finally restored. Since a common control channel is used by a number of mobile equipments on the time sharing basis as described previously, if the transmitter keeps the transmission at its full output power on this common channel, communication of other subscribers will be seriously disturbed, and probably the base station cannot receive a call signal at all in the cell where the mobile equipment in trouble is located.

The possible components causing such troubles are the switching transistor 71 in transmitter unit 3 (FIG. 4) for producing the transmitter on/off signal, the data latch 26 in logic unit 6 for commanding the transmitter on/off, and short-circuited lines connecting transmitter unit 3 with logic unit 6. In order to check such troubles, it is necessary to introduce a power monitoring signal 54 which indicates that the output power is transmitted from the power detector circuit 103 in FIG. 5 to the logic unit, as shown in FIG. 2. If output power is detected on the power monitoring line when the output power must be off (the transmitter section is faulty), the following action has been taken in the conventional system.

Figure 6:
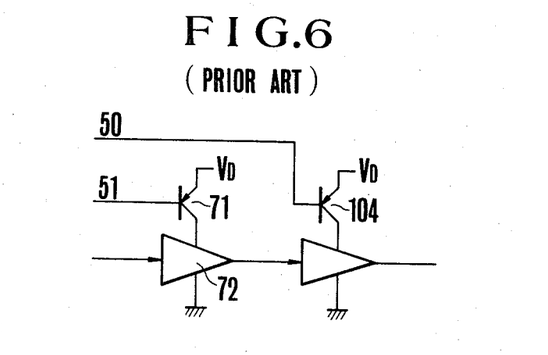
FIG. 6 is a circuit diagram showing an example of a conventional transmitter on/off control circuit.

In one example, the DC power supply in the mobile equipment is forced to cut off, or in the second example, the mobile equipment is provided with dual transmitter activation switches as shown in FIG. 6 so that output power can be shut off when at least one of the switches is turned off. As shown in FIG. 6, the power supply to the exciter amplifier is controlled in dual mode by means of transistors 71 and 104 with respective signals 50 and 51 applied thereto, and output power is transmitted only when both transistors are switched on simultaneously. These methods, however, require additional hardware to be built in the mobile equipment, and moreover, another data latch of the logic unit must have been prepared in a different package in order to prevent double fault.

Figure 7A:
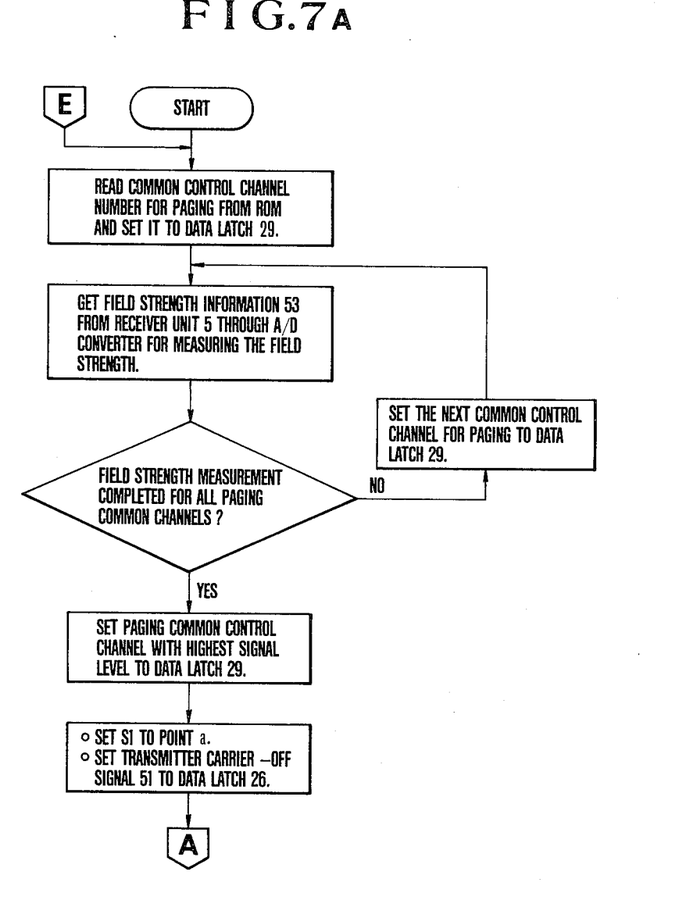
FIGS. 7A to 7D are flow charts useful for explaining the operation of a logic unit used in the mobile transceiver equipment shown in FIG. 2.
Figure 7B:
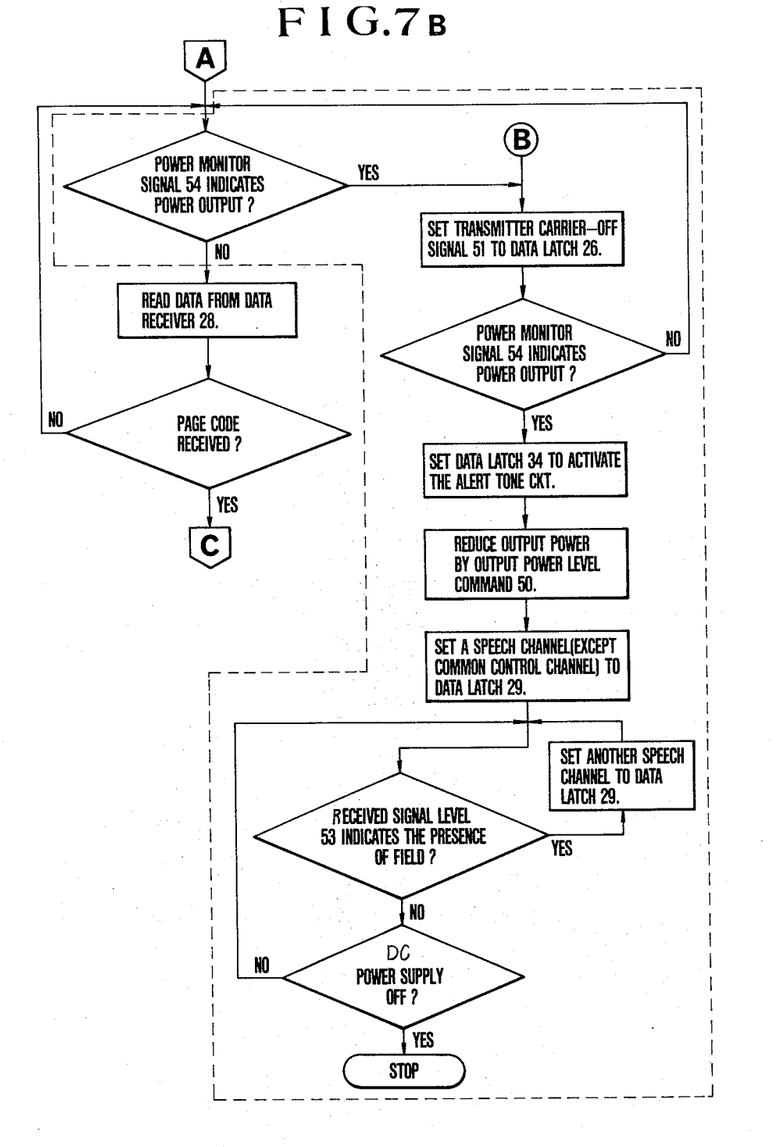
Figure 7C:
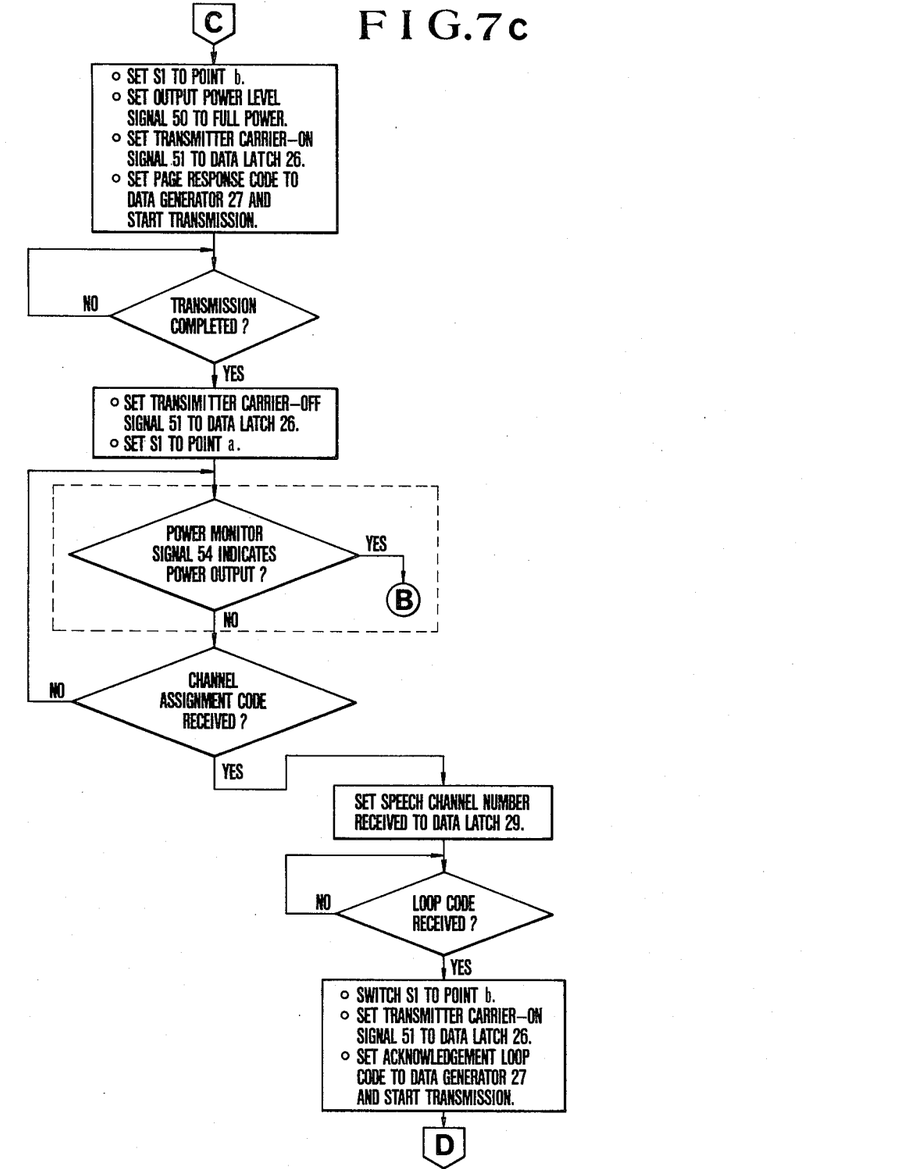
Figure 7D:
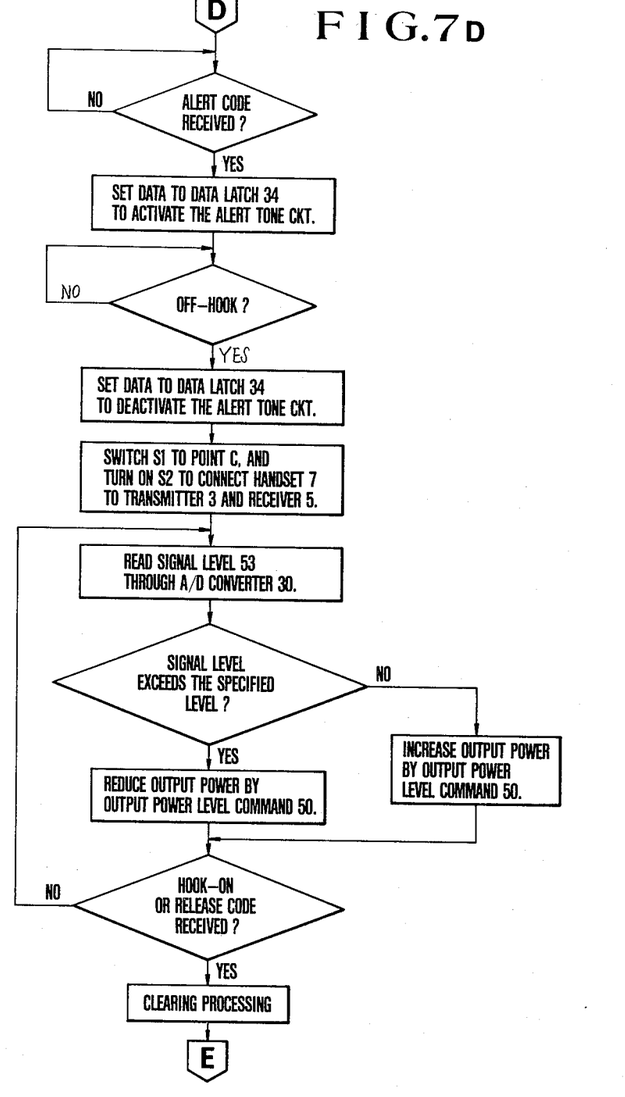

Therefore, the present invention contemplates to accomplish the same effect as expected in conventional equipments by making full use of the existing functions involved in the equipment. The present invention is characterized in that the power monitoring line for conducting signal 54 shown in FIG. 2 is provided between the power level controller 11 and multiplexer 25, so that the process steps enclosed by dotted lines in FIGS. 7B and 7C are carried out.

With such arrangement, the power monitoring line is checked while the mobile equipment waits for a call or waits for the channel assignment, and if the signal level (e.g. high) shows that output power for signal 54 is transmitted, the data latch 26 is loaded again so as to turn off the transmitter on/off signal 51. If signal 54 on the power monitor line still remains high, the alert circuit 35 is turned on for indicating to the mobile subscriber that the equipment is in trouble. The alert tone, which may be different from the paging alert tone or may be exactly the same, keeps signaling until the DC power supply in the mobile equipment is switched off. The faulty mobile equipment is thus deactivated for repairing after disconnection from the power supply.

During the activation of the alert tone circuit, data is set to the data latch 26 so as to issue the power reduction signal 50 regardless of the input field strength. As the result of this operation, output power is reduced considerably (e.g. reduction by 15 dB (1/30 of the normal level) and the propagation range of the radio wave is also reduced (e.g. down to 40% with 15 dB power reduction). Furthermore, the channel data latch 29 connected with the frequency synthesizer 4 is assigned a channel other than that for the common control channel stored in RAM 33 and/or ROM 32. Then, the signal strength 53 of that channel is measured to examine whether or not the channel of interest is in use. If the channel is used, the system switches the channel to another speech channel, and waits for the cutting-off of the DC power on a channel which is not used. In this case, if the logic unit 6 memorizes the frequency of at least one speech channel of each cell or the algorithm of frequency allocation, the system will probably wait for the cut-off of the DC power supply on a channel allocated to another cell. When the mobile equipment waits for a call on a channel which is assigned to another cell, power is equivalently not transmitted at all in a sense of the whole system. Even if the system is faulty equipment locked onto a channel which is assigned to the cell where it is located, the influence is limited to a narrow area because of a reduced power. Since a speech channel is locked, the number of speech channels is temporarily reduced until the mobile subscriber switches off the power. For example, for a mobile communication system with 20 speech channels, the block rate which has been 3% will increase to not more than approximately 5%, even if a trouble occurs in the traffic busy hour. In the case of the mobile telephone system, the mobile subscriber is probably seated near the mobile equipment, and thus the DC power is probably cut off in response to the alert tone. Thus, the identical effect as that of conventional systems can be obtained without need for additional transistors and control of the DC power supply.

In the foregoing embodiment of the mobile communication system including transmitters and receivers, the logic circuit is provided for selectively driving automatic reduction in the output of the transmitter and switching of channels. The transmitter activates and deactivates transmission repetitively for calling and paging in accordance with a predetermined program. If an RF power output monitoring signal sensed when the transmission is deactivated, an alarm signal is emitted to the mobile subscriber, the channel is switched, and the transmitter output is reduced in accordance with the timing of the selective drive which is included in the program. The concept of the present invention is, however, achieved by constructing the basic blocks as shown in FIG. 3, not only in the form of an automated control system by use of software as described in the foregoing embodiment, but also in the form of a control system by use of appropriate hardware.

Figure 3:
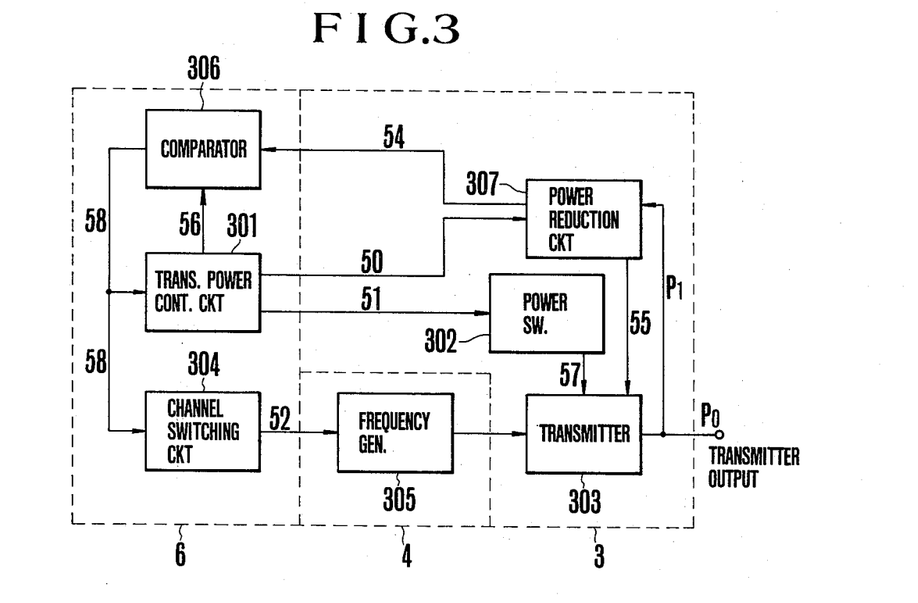
FIG. 3 is a schematic block diagram of the transmitter control section included in the mobile transceiver equipment shown in FIG. 2.

In FIG. 3, a power switch 302, an FM transmitter 303 and a transmitter power reduction circuit 307 are included in the transmitter unit 3 in FIG. 2, a frequency generator 305 is included in the frequency synthesizer unit 4, and a transmitter power control circuit 301, a channel switching circuit 304 and a comparator 306 are included in the logic unit 6. The same reference numbers (50, 51, 52, 54, 55, 57 and 58) are used for denoting signals in FIGS. 2 and 3. Accordingly, the power switch 302 corresponds to the switching transistor 71 in FIG. 4, the transmitter 303 corresponds to elements 12, 13, 14, 15 and 16 in FIG. 2, the power reduction circuit 307 corresponds to element 200 in FIG. 5, the frequency generator 305 corresponds to frequency synthesizer unit 4, the transmitter power control circuit 301 corresponds to elements 26, 31, 32 and 33, the channel switching circuit 304 corresponds to elements 29, 31, 32 and 33 and the comparator 306 corresponds to elements 25, 31, 32 and 33. The transmitter power control circuit 301 includes an activation control circuit for switching off and activating FM transmitter and a transmitter power reduction control circuit. When the power switch 302 is turned on by issuing of a transmitter-on signal from the transmitter power control circuit, DC power is supplied to the FM transmitter 303 and it can be kept in operating state. In addition, when transmitter power reduction circuit 307 is driven with the control signal for reducing the transmitter power being sent from the transmitter power reduction control circuit, the RF output power of FM transmitter 303 can be reduced. The FM transmitter 303 uses a channel which is set by selecting frequencies of frequency generator 305, and an FM carrier corresponding to the channel selected in the frequency generator 305 is supplied to the transmitter 303. The comparator 306 is supplied with the transmitter-on signal from transmitter power control circuit 301 via line 56 and a detected signal obtained by detecting the RF output power from FM transmitter 303 through a loose coupling detector in the transmitter power reduction circuit 307, and it compares both input signals. Assuming that the detected signal is P1, the transmitter output is Po and a relatively large positive number is a (e.g. a=100), there is the following relationship:

$$P1 = Po/a$$

One of outputs from the comparator 306 is conducted to the transmitter power control circuit 301 so as to control the RF output power level reduction control circuit in it, and the other is adapted to control the channel switching circuit 304.

When the transmitter power control circuit 301 is operated to drive the activation control circuit, the power switch 302 is turned on and the FM transmitter enters the operating state. By setting channel switching circuit 304 to a control channel of the mobile communication system, for example, the transmitter output is obtained from FM transmitter 303. Assuming that the equipment is in the normal operation, the comparator 306 is supplied with the active start signal and transmitter power detection signal. In this case, a coincidence output, e.g. logical low level, appears at the output of comparator 306, and the transmitted power reduction control circuit in transmitter power control circuit 301 and channel switching circuit 304 connected to the output of the comparator are not driven. Thus, the equipment can continue to operate on the control channel. However, in the event of the occurrence of abnormality, for example, that the radio wave is kept emitted from the transmitter 303, the activation signal given to the comparator 306 goes off but the transmitter output detection signal is kept supplied, and an incoincidence output, e.g. logical high level, will appear at the output of the comparator 306. This output signal drives the transmitter power reduction control circuit in transmitter power control circuit 301 and the channel switching circuit 304, and the former controls the transmitter power reduction circuit 307 to reduce the transmitter output of transmitter 303 and the latter drives the channel switching circuit 304 to switch the channel to another channel.

The concept of the present invention as described above with reference to FIG. 3 was practised by means of the sequence controller using the microprocessor, read only memory and random access memory in the FIG. 2 embodiment. But, apart from the microprocessor controlling, a similar processing may be accomplished by a timing circuit comprised of a clock generator and a counter or by a random logic circuit comprised of shift registers.

What is claimed is:

1. In a multi-channel mobile radio transmitter, a transmitter control system comprising:
   transmitter means for transmitting one of multiple channel frequencies;
   output power control means for controlling the transmitter means so as to reduce the transmitter output;
   channel switching means for selecting one of the multiple channel frequencies to be transmitted from the transmitter means; and
   comparator means for comparing a transmitter activation signal with a signal from the transmitter output so that a comparison signal produced upon occurrence of failure of the transmitter means drives the channel switching means and the output power control means to select another channel and to reduce the transmitter output, respectively.

2. A transmitter control system according to claim 1, wherein said output power control means further controls the transmitter means so as to selectively activate or deactivate such and wherein said comparison signal indicates the failure of the transmitter means when the output power control means deactivates the transmitter output.

3. A transmitter control system according to claim 1, wherein the signal from the transmitter means which is compared with the transmitter activation signal comprises a fraction of the magnitude of the transmitter output.

4. A transmitter control system according to claim 1 which further comprises means responsive to said comparison signal for providing an alert signal.

5. A transmitter control system according to claim 1, wherein said control means switching means and comparator means are comprised of a read only memory, a random access memory and microprocessor, said read only memory storing a predetermined program whereby said transmitter means transmits its output and said output power control means activates and deactivates transmission repetitively in accordance with said predetermined program.

* * * * *

UNITED STATES PATENT AND TRADEMARK OFFICE
CERTIFICATE OF CORRECTION

PATENT NO. : 4,373,206
DATED : February 8, 1983
INVENTOR(S) : Yoshiharu Suzuki; Tomokazu Kai It is certified that error appears in the above-identified patent and that said Letters Patent are hereby corrected as shown below:

On title page "Assignee: Nippon Electric Co., Inc., Tokyo Japan" should read --Assignee: Nippon Electric Co., Ltd., Tokyo, Japan--.

Signed and Sealed this

Nineteenth Day of April 1983

[SEAL]

Attest:

Attesting Officer

GERALD J. MOSSINGHOFF

Commissioner of Patents and Trademarks

UNITED STATES PATENT AND TRADEMARK OFFICE
CERTIFICATE OF CORRECTION

PATENT NO. : 4,373,206
DATED : Feb 8, 1983
INVENTOR(S) : Suzuki, et al.

It is certified that error appears in the above-identified patent and that said Letters Patent are hereby corrected as shown below:

| COLUMN | LINE | DESCRIPTION |
|---|---|---|
| 4 | 23 | Delete "$f_{2i}$", insert --$f_{c2i}$--. |
| 4 | 57 | Delete "of", insert --on--. |
| 7 | 49 | After the word "is" delete "a", and insert --a--. |

Signed and Sealed this

Twenty-sixth Day of November 1985

[SEAL]

Attest:

Attesting Officer

DONALD J. QUIGG

Commissioner of Patents and Trademarks